US010696351B2

(12) United States Patent
Suzuki et al.

(10) Patent No.: US 10,696,351 B2
(45) Date of Patent: Jun. 30, 2020

(54) BICYCLE CONTROLLER, BICYCLE COMPONENT, AND BICYCLE CONTROL SYSTEM

(71) Applicant: Shimano Inc., Sakai, Osaka (JP)

(72) Inventors: Takafumi Suzuki, Osaka (JP); Takaya Masuda, Osaka (JP); Yoshiyuki Kasai, Osaka (JP)

(73) Assignee: Shimano Inc., Osaka (JP)

( * ) Notice: Subject to any disclaimer, the term of this patent is extended or adjusted under 35 U.S.C. 154(b) by 50 days.

(21) Appl. No.: 15/639,136

(22) Filed: Jun. 30, 2017

(65) Prior Publication Data

US 2018/0009508 A1 Jan. 11, 2018

(30) Foreign Application Priority Data

Jul. 11, 2016 (JP) ................. 2016-137060

(51) Int. Cl.
| | |
|---|---|
| *B62K 23/00* | (2006.01) |
| *F16H 59/10* | (2006.01) |
| *F16H 59/04* | (2006.01) |
| *F16H 59/02* | (2006.01) |
| *F16H 61/02* | (2006.01) |
| *B62M 25/08* | (2006.01) |
| *H04B 1/00* | (2006.01) |

(52) U.S. Cl.
CPC ............ *B62K 23/00* (2013.01); *B62M 25/08* (2013.01); *F16H 59/0217* (2013.01); *F16H 59/044* (2013.01); *F16H 59/105* (2013.01); *F16H 61/02* (2013.01); *F16H 61/0248* (2013.01); *F16H 2059/0221* (2013.01); *H04B 1/005* (2013.01)

(58) Field of Classification Search
CPC ................. B62K 23/00; B62M 25/08; B62M 2701/0046; H04B 1/005; F16H 61/0248; F16H 61/02; F16H 59/0217; F16H 59/044; F16H 59/105; F16H 2059/0221
See application file for complete search history.

(56) References Cited

U.S. PATENT DOCUMENTS

| | | | |
|---|---|---|---|
| 6,151,295 A | 11/2000 | Ma et al. | |
| 7,563,998 B2 * | 7/2009 | Ueno ..................... | B62M 25/08 200/61.88 |
| 7,760,078 B2 * | 7/2010 | Miki et al. ............. | B62M 25/08 340/432 |
| 7,902,967 B2 * | 3/2011 | Takebayashi .......... | B62M 25/08 340/432 |

(Continued)

FOREIGN PATENT DOCUMENTS

| | | |
|---|---|---|
| JP | 05-268112 A | 10/1993 |
| JP | 2002-505551 A | 2/2002 |

(Continued)

*Primary Examiner* — Dale W Hilgendorf
(74) *Attorney, Agent, or Firm* — Global IP Counselors, LLP

(57) ABSTRACT

A bicycle controller is configured to communicate with a first bicycle component that transmits a first wireless signal and a second bicycle component that transmits a second wireless signal. The bicycle controller includes an interface configured to receive the first wireless signal and the second wireless signal. The first wireless signal has a center frequency that is a first frequency. The second wireless signal has a center frequency that is a second frequency. The second frequency differs from the first frequency.

15 Claims, 12 Drawing Sheets

(56) References Cited

U.S. PATENT DOCUMENTS

| | | | |
|---|---|---|---|
| 8,655,561 B2* | 2/2014 | Kitamura | B62M 25/08 701/51 |
| 8,874,338 B2* | 10/2014 | Miglioranza | B62M 25/08 701/66 |
| 9,399,500 B1* | 7/2016 | Hashimoto et al. | B62M 25/08 |
| 2008/0114519 A1 | 5/2008 | DuFaux et al. | |
| 2010/0207351 A1* | 8/2010 | Klieber | B62K 19/36 280/278 |
| 2012/0024639 A1* | 2/2012 | Castro | B60T 7/16 188/24.22 |
| 2012/0109436 A1 | 5/2012 | Saida | |
| 2014/0102237 A1* | 4/2014 | Jordan et al. | B62M 25/08 74/473.12 |
| 2014/0318306 A1* | 10/2014 | Tetsuka | B62M 25/08 74/502.2 |
| 2014/0358385 A1 | 12/2014 | Fusari et al. | |
| 2014/0358386 A1 | 12/2014 | Cracco et al. | |
| 2014/0358387 A1 | 12/2014 | Cracco et al. | |
| 2015/0009019 A1 | 1/2015 | Watarai et al. | |
| 2016/0167738 A1* | 6/2016 | Fukao et al. | B62M 25/08 701/52 |
| 2016/0280327 A1* | 9/2016 | Tiso et al. | B62M 25/08 |
| 2016/0311499 A1* | 10/2016 | Kasai | B62M 25/08 |
| 2016/0339986 A1* | 11/2016 | Jordan et al. | B62M 25/08 |

FOREIGN PATENT DOCUMENTS

| | | |
|---|---|---|
| JP | 3149542 U | 4/2009 |
| JP | 2012096614 A | 5/2012 |
| JP | 2014-231330 A | 12/2014 |
| JP | 2014-237435 A | 12/2014 |
| JP | 2015-27861 A | 2/2015 |
| KR | 1020040099900 A1 | 12/2004 |

* cited by examiner

Fig.3

| Channel | Lowest Frequency [MHz] | Center Frequency [MHz] | Highest Frequency [MHz] |
|---|---|---|---|
| 1 | 2401 | 2412 | 2423 |
| 2 | 2406 | 2417 | 2428 |
| 3 | 2411 | 2422 | 2433 |
| 4 | 2416 | 2427 | 2438 |
| 5 | 2421 | 2432 | 2443 |
| 6 | 2426 | 2437 | 2448 |
| 7 | 2431 | 2442 | 2453 |
| 8 | 2436 | 2447 | 2458 |
| 9 | 2441 | 2452 | 2463 |
| 10 | 2446 | 2457 | 2468 |
| 11 | 2451 | 2462 | 2473 |
| 12 | 2456 | 2467 | 2478 |
| 13 | 2461 | 2472 | 2483 |
| 14 | 2473 | 2484 | 2495 |

BICYCLE CONTROLLER, BICYCLE COMPONENT, AND BICYCLE CONTROL SYSTEM

CROSS-REFERENCE TO RELATED APPLICATIONS

This application claims priority to Japanese Patent Application No. 2016-137060, filed on Jul. 11, 2016. The entire disclosure of Japanese Patent Application No. 2016-137060 is hereby incorporated herein by reference.

BACKGROUND

Field of the Invention

The present invention relates to a bicycle controller, a bicycle component, and a bicycle control system.

Background Information

A known bicycle controller is configured to receive a wireless signal from a bicycle component. Japanese Laid-Open Patent Publication No. 2014-231330 (Patent Document 1) discloses one example of a bicycle controller configured to receive a wireless signal including information of the gear position or the like of a shifting device from an operating device.

SUMMARY

Wireless communication used in the field of bicycles needs to have a higher level of stability.

In a first aspect of the invention, a bicycle controller is configured to communicate with a first bicycle component configured to transmit a first wireless signal and a second bicycle component configured to transmit a second wireless signal. The bicycle controller includes an interface configured to receive the first wireless signal and the second wireless signal. The first wireless signal has a center frequency that is a first frequency. The second wireless signal has a center frequency that is a second frequency. The second frequency differs from the first frequency.

In a second aspect of the invention, in the bicycle controller according to the preceding aspect, the interface includes a first interface that is configured to receive the first wireless signal and a second interface that is configured to receive the second wireless signal.

In a third aspect of the invention, in the bicycle controller according to any one of the preceding aspects, the interface is configured to transmit a third wireless signal having a center frequency that is a third frequency.

In a fourth aspect of the invention, in the bicycle controller according to the third aspect, the third frequency differs from the first frequency and the second frequency.

In a fifth aspect of the invention, in the bicycle controller according to the third or fourth aspect depending on the second aspect, at least the first interface is configured to transmit the third wireless signal.

In a sixth aspect of the invention, in the bicycle controller according to any one of the preceding aspects, the interface includes a third interface that transmits a control signal to a third bicycle component coupled to a bicycle. The bicycle controller further includes a processor that generates the control signal, which is transmitted to the third bicycle component.

In a seventh aspect of the invention, in the bicycle controller according to the sixth aspect, the third bicycle component includes a shifting device coupled to the bicycle, and at least the first wireless signal includes data for controlling the shifting device.

In an eighth aspect of the invention, in the bicycle controller according to the sixth aspect, the third bicycle component includes a suspension coupled to the bicycle, and at least the first wireless signal includes data for controlling the suspension.

In a ninth aspect of the invention, in the bicycle controller according to the sixth aspect, the third bicycle component includes an adjustable seatpost coupled to the bicycle, and at least the first wireless signal includes data for controlling the adjustable seatpost.

In a tenth aspect of the invention, in the bicycle controller according to the sixth aspect, the third bicycle component includes an electric assist unit coupled to the bicycle, and at least the first wireless signal includes data for controlling the electric assist unit.

In an eleventh aspect of the invention, in the bicycle controller according to the sixth aspect, the third bicycle component includes an electric brake coupled to the bicycle, and at least the first wireless signal includes data for controlling the electric brake.

In a twelfth aspect of the invention, in the bicycle controller according to the sixth aspect, the third bicycle component includes a light coupled to the bicycle, and at least the first wireless signal includes data for controlling the light.

In a thirteenth aspect of the invention, in the bicycle controller according to the sixth aspect, the third bicycle component includes a cycle computer coupled to the bicycle, and at least the first wireless signal includes data for controlling the cycle computer.

In a fourteenth aspect of the invention, in the bicycle controller according to any one of the seventh to thirteenth aspects, the first wireless signal includes at least one data set, the at least one data set includes a plurality of pieces of the data, and at least two of the a plurality of pieces of the data have the same content.

In a fifteenth aspect of the invention, a bicycle control system includes the bicycle controller according to any one of the preceding aspects, and at least one of the first bicycle component and the second bicycle component.

In a sixteenth aspect of the invention, in the bicycle control system according to the fifteenth aspect, in a case that the at least one of the first bicycle component and the second bicycle component receives a wireless signal that differs from the first wireless signal and has a center frequency that is the first frequency or a wireless signal that differs from the second wireless signal and has a center frequency that is the second frequency, the at least one of the first bicycle component and the second bicycle component suspends transmission of the first wireless signal or the second wireless signal.

In a seventeenth aspect of the invention, in the bicycle control system according to the fifteenth or sixteenth aspect, the at least one of the first bicycle component and the second bicycle component is configured to transmit both of the first wireless signal and the second wireless signal.

In an eighteenth aspect of the invention, in the bicycle control system according to the seventeenth aspect, in a case that the at least one of the first bicycle component and the second bicycle component receives a wireless signal that differs from the first wireless signal and has a center frequency that is the first frequency, the at least one of the first bicycle component and the second bicycle component changes the center frequency of the first wireless signal from the first frequency, and in a case that the at least one of the first bicycle component and the second bicycle component receives a wireless signal that differs from the second wireless signal and has a center frequency that is the second frequency, the at least one of the first bicycle component and the second bicycle component changes the center frequency of the second wireless signal from the second frequency.

In a nineteenth aspect of the invention, a bicycle control system includes the bicycle controller according to any one of the first to sixth aspects, and one of a shifting device, a suspension, an adjustable seatpost, an electric assist unit, an electric brake, a light, and a cycle computer that are coupled to a bicycle.

In a twentieth aspect of the invention, in the bicycle control system according to the nineteenth aspect, the one of the shifting device, the suspension, the adjustable seatpost, the electric assist unit, the electric brake, a light and the cycle computer that are coupled to a bicycle includes a housing, and the bicycle controller is located in the housing.

In a twenty-first aspect of the invention, a bicycle controller that is configured to communicate with a bicycle component configured to transmit a first wireless signal and a second wireless signal. The first wireless signal has a center frequency that is a first frequency. The second wireless signal has a center frequency that is a second frequency. The second frequency differs from the first frequency. The bicycle controller includes an interface that receives the first wireless signal and the second wireless signal.

In a twenty-second aspect of the invention, a bicycle component that is configured to transmit a first wireless signal and a second wireless signal. The first wireless signal has a center frequency that is a first frequency. The second wireless signal has a center frequency that is a second frequency. The second frequency differs from the first frequency.

In a twenty-third aspect of the invention, in the bicycle component according to the twenty-second aspect, the bicycle component includes a bicycle operating device.

In a twenty-fourth aspect of the invention, in the bicycle component according to the twenty-third aspect, the bicycle operating device is an operating device of a shifting device.

The present invention provides a bicycle controller, a bicycle component, and a bicycle control system that improve the stability of wireless communication.

BRIEF DESCRIPTION OF THE DRAWINGS

Referring now to the attached drawings which form a part of this original disclosure.

FIG. 3 is a table showing channels in the IEEE 802.11b standard.

EMBODIMENTS OF THE INVENTION

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
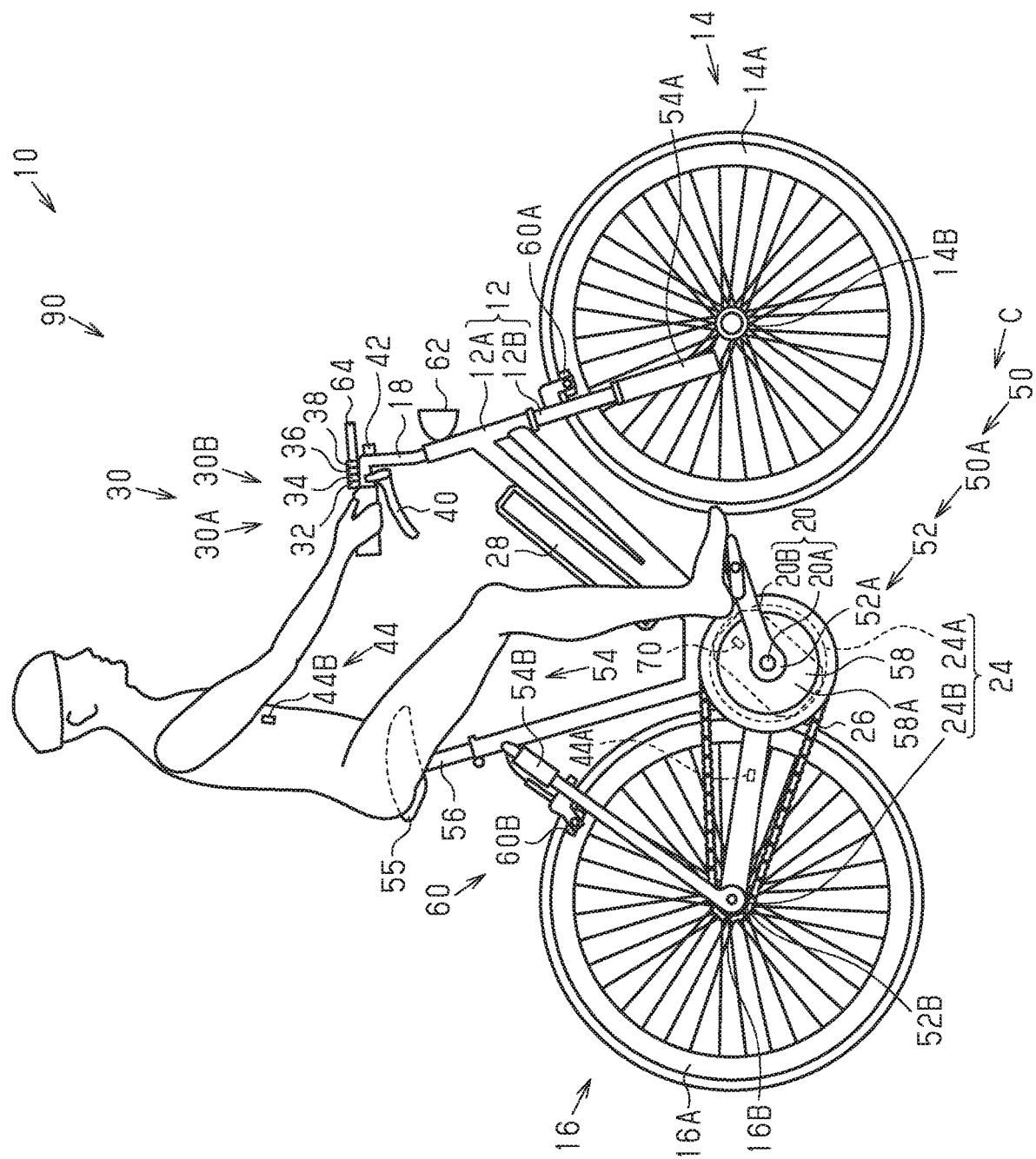
FIG. 1 is a side elevational view showing a bicycle equipped with a bicycle controller in accordance with a first embodiment.

As shown in FIG. 1, an electric assist bicycle 10 (hereafter, referred to as "the bicycle 10") includes a bicycle body 12, a front wheel 14, a rear wheel 16, a handlebar 18, cranks 20, sprockets 24, a chain 26, a battery 28, a bicycle controller 70 (hereafter, referred to as "the controller 70") and a plurality of bicycle components C. The bicycle body 12 includes a frame 12A and a front fork 129. The bicycle components C include a first group 30 and a second group 50.

The front wheel 14 includes a wheel 14A and a hub 14B. The rear wheel 16 includes a wheel 16A and a hub 16B. The front wheel 14 and the rear wheel 16 are supported by the frame 12A in a manner rotational to the frame 12A. The handlebar 18 is supported by the frame 12A so that the forward direction of the front wheel 14 can be changed.

The cranks 20 include a crank axle 20A, a right crank 20B and a left crank (not shown). The crank axle 20A is supported by the frame 12A in a manner rotational to the frame 12A. The right crank 20B and the left crank are coupled to the crank axle 20A. The sprockets 24 include a front sprocket 24A and a rear sprocket 24B. The front sprocket 24A is coupled to the right crank 20B. The rear sprocket 24B is coupled to the wheel 16A of the rear wheel 16. The chain 26 runs around the front sprocket 24A and the rear sprocket 24B. The rider applies a driving force to the bicycle 10 to rotate the cranks 20. Rotation of the front sprocket 24A, which is rotated together with the cranks 20, is transmitted to the rear sprocket 24B by the chain 26. This rotates the rear sprocket 24B and the wheel 16A of the rear wheel 16.

The battery 28 is coupled to the frame 12A to supply electric power to at least the second group 50 and the controller 70. In a first example of the first group 30, the first group 30 incorporates a power generation mechanism (not shown), which includes a solar cell or a piezoelectric element, and is operated by power generated in the power generation mechanism. In a second example of the first group 30, the first group 30 is operated by power supplied from the battery 28.

The first group 30 includes a bicycle operating device and includes at least one of a first bicycle component 30A and a second bicycle component 30B. The first bicycle component 30A is one of the bicycle components C that is configured to transmit a first wireless signal. The second bicycle component 30B is one of the bicycle components C that is configured to transmit a second wireless signal. The first group 30 includes, for example, shifting device operating devices 32, suspension operating devices 34, an adjustable seatpost operating device 36, an electric assist unit operating device 38, brake operating devices 40, a light operating device 42 and a sensor 44. The shifting device operating devices 32 include a front shifting device operating device 32A and a rear shifting device operating device 32B (both shown in FIG. 2). The suspension operating devices 34 include a front suspension operating device 34A and a rear suspension operating device 34B (both shown in FIG. 2). The brake operating devices 40 include a front brake operating device 40A and a rear brake operating device 40B (both shown in FIG. 2). The first bicycle component 30A and the second bicycle component 30B are any two of the components in the first group 30. The first bicycle component 30A is, for example, the front shifting device operating device 32A. The second bicycle component 30B is, for example, the rear shifting device operating device 32B.

The second group 50 includes at least one third bicycle component 50A. The third bicycle component 50A is one of the bicycle components C that is controlled based on a wireless signal transmitted to the controller 70 from at least one of the first bicycle component 30A and the second bicycle component 30B. The second group 50 includes, for example, shifting devices 52, suspensions 54, an adjustable seatpost 56, an electric assist unit 58, electric brakes 60, a light 62 and a cycle computer 64, each of which is coupled to the bicycle 10. The shifting devices 52 include a front shifting device 52A and a rear shilling device 52B. The suspensions 54 include a front suspension 54A and a rear suspension 54B. The electric assist unit 58 includes a housing 58A. The electric brakes 60 include a front brake 60A and a rear brake 60B. The third bicycle component 50A is at least one of the components in the second group 50. The third bicycle component 50A includes, for example, the front shifting device 52A and the rear shifting device 52B, which are included in the shifting devices 52.

The front suspension operating device 34A is connected to the front suspension 54A to be able to perform wired or wireless communication with the front suspension 54A. The rear suspension operating device 34B is connected to the rear suspension 54B to be able to perform wired or wireless communication with the rear suspension 54B. The adjustable seatpost operating device 36 is connected to the adjustable seatpost 56 to be able to perform wired or wireless communication with the adjustable seatpost 56. The electric assist unit operating device 38 is connected to the electric assist unit 58 to be able to perform wired or wireless communication with the electric assist unit 58. The brake operating device 40 is connected to the electric brakes 60 to be able to perform wired or wireless communication with the electric brakes 60. The light operating device 42 is connected to the light 62 to be able to perform wired or wireless communication with the light 62. The sensor 44 is connected to the cycle computer 64 to be able to perform wired or wireless communication with the cycle computer 64.

The front shifting device 52A is an internal shifting device arranged in the electric assist unit 58. The front shifting device 52A changes the speed of rotation that is input to the cranks 20, and transmits the rotation to the front sprocket 24A. The rear shifting device 52B is an internal geared hub arranged on a hub 16B of the rear wheel 16. The rear shifting device 52B changes the speed of rotation that is input to the rear sprocket 24B and transmits the rotation to the wheel 16A. The front shifting device 52A and the rear shifting device 52B each incorporates a planetary gear mechanism (not shown) including gears (not shown). The engagement state of the gears is changed by an electrically-driven actuator (not shown).

The front shifting device operating device 32A operates the front shifting device 52A, and is coupled to, for example, the handlebar 18. The rear shifting device operating device 32B operates the rear shifting device 52B, and is coupled to, for example, the handlebar 18. Each of the front shifting device operating device 32A and the rear shifting device operating device 32B and the corresponding shifting device 52 are configured to establish a data link through wireless communication to exchange data sets with each other. The front shifting device operating device 32A, the rear shifting device operating device 32B, the front shifting device 52A and the rear shifting device 52B each include a transmission-reception circuit. The front shifting device operating device 32A and the front shifting device 52A exchange data sets with each other through the established data link. The rear shifting device operating device 32B and the rear shifting device 52B exchange data sets with each other through the established data link. Each data set is, for example, information indicating the state of the corresponding shifting device 52 and information used to control the shifting device 52.

In a case that the rider inputs a shift up instruction to the front shifting device operating device 32A, the front shifting device 52A changes the speed to increase the gear ratio of the bicycle 10. In a case that the rider inputs a shift up instruction to the rear shifting device operating device 32B, the rear shifting device 52B changes the speed to increase the gear ratio of the bicycle 10. In a case that the rider inputs a shift down instruction to the front shifting device operating device 32A, the front shifting device 52A changes the speed to decrease the gear ratio of the bicycle 10. In a case that the rider inputs a shift down instruction to the rear shifting device operating device 32B, the rear shifting device 52B changes the speed to decrease the gear ratio of the bicycle 10.

The front suspension 54A is arranged on the front fork 129. The front suspension 54A supports the front wheel 14 in a manner configured to change the position of the front wheel 14 relative to the front fork 12B. The front suspension 54A includes an elastic body (not shown), which absorbs the impact applied to the front wheel 14 by converting the impact into elastic energy. The elastic body is, for example, a cylinder that encloses a spring, air, oil and a fluid including a magnetic fluid. The state of the elastic body incorporated in the front suspension 54A is changed by an electrically-driven actuator (not shown). The front suspension 54A is configured to adjust the damping ratio of the impact applied to the front wheel 14.

The rear suspension 54B is arranged between the rear wheel 16 and the frame 12A. The rear suspension 54B supports the rear wheel 16 in a manner configured to change the position of the rear wheel 16 relative to the frame 12A. The rear suspension 54B has the same structure as the front suspension 54A. The rear suspension 54B is configured to adjust the damping ratio of the impact applied to the rear wheel 16.

The front suspension operating device 34A operates the front suspension 54A, and is coupled to, for example, the handlebar 18. The rear suspension operating device 34B operates the rear suspension 54B, and is coupled to, for example, the handlebar 18. The front suspension 54A and the front suspension operating device 34A are connected by wired communication, and configured to establish a data link to exchange data sets with each other. The rear suspension 54B and the rear suspension operating device 34B are configured to establish a data link to exchange data sets with each other. The process for establishing the data link is the same as that used for the shifting devices 52 and the shifting device operating devices 32.

In a case that the rider inputs a lockout instruction to the front suspension operating device 34A, the front suspension MA locks the position of the front wheel 14 relative to the front fork 12B. In a case that the rider inputs an open instruction to the front suspension operating device 34A, the front suspension 54A unlocks the position of the front wheel 14 relative to the front fork 12B. In a case that the rider inputs a damping ratio increase instruction to the front suspension operating device 34A, the damping ratio of the front suspension 54A, which damps the impact applied to the front suspension 54A, is set to be high. In a case that the rider inputs a damping ratio decrease instruction to the front suspension operating device 34A, the damping ratio of the front suspension 54A is set to be low. In a case that the rider inputs a long stroke instruction to the front suspension operating device 34A, the stroke of the front suspension 54A is set to be long. In a case that the rider inputs a short stroke instruction to the front suspension operating device 34A, the stroke of the front suspension 54A is set to be short. The rear suspension operating device 34B is operated in the same manner as the front suspension operating device 34A. Also, the actions of the rear suspension 54B that is performed in accordance with the operation of the rear suspension operating device 34B is the same as that of the front suspension 54A.

The adjustable seatpost 56 is coupled to the frame 12A, and configured to support a seat 55 on which the user sits. The adjustable seatpost 56 has a structure for changing the height of the adjustable seatpost 56 relative to the frame 12A. The height of the adjustable seatpost 56 relative to the frame 12A is changed by an electrically-driven actuator (not shown).

The adjustable seatpost operating device 36 operates the adjustable seatpost 56. The adjustable seatpost operating device 36 is coupled to, for example, the handlebar 18. The adjustable seatpost 56 and the adjustable seatpost operating device 36 are connected by wired communication, and configured to establish a data link to exchange data sets with each other. The process for establishing the data link is the same as that used for the shifting devices 52 and the shifting device operating devices 32.

In a case that the rider inputs a lifting or raising instruction to the adjustable seatpost operating device 36, the adjustable seatpost 56 is raised relative to the frame 12A. In a case that the rider inputs a lowering instruction to the adjustable seatpost operating device 36, the adjustable seatpost 56 is lowered relative to the frame 12A.

The electric assist unit 58 includes an assist motor (not shown) in the housing 58A. The electric assist unit 58 assists rotation of the cranks 20 using the assist motor. The assist motor is, for example, an electric motor. Rotation produced by the assist motor is transmitted to the front sprocket 24A through a reduction gear (not shown). In one example, a one-way clutch is arranged between the assist motor and the front sprocket 24A to avoid the torque input to the cranks 20 from being transmitted to the assist motor.

The electric assist unit operating device 38 operates the electric assist unit 58. The electric assist unit operating device 38 is coupled to, for example, the handlebar 18. The electric assist unit 58 and the electric assist unit operating device 38 are connected by wired communication, and configured to establish a data link to exchange data sets with each other. The process for establishing the data link is the same as that used for the shifting devices 52 and the shifting device operating devices 32.

The electric assist unit 58 includes a plurality of modes. The modes include, for example, a normal mode and an ECO mode. The electric assist unit operating device 38 is operated to select one of the modes in which the electric assist unit 58 is operated. The upper limit of the output of the assist motor is set in accordance with the mode instructed by the operation of the electric assist unit operating device 38. The output of the assist motor in a state where the normal mode is instructed has a higher upper limit than that in a state where the ECO mode is instructed.

The front brake 60A is arranged proximate to the front wheel 14 to attenuate rotation force of the front wheel 14. The front brake 60A includes brake pads (not shown) configured to contact the wheel 14A. The front brake 60A converts kinetic energy of the front wheel 14 into thermal energy generated by friction. This attenuates the rotation force of the front wheel 14. The brake pads are, for example, rubber. The front brake 60A functions to detect that the front wheel 14 is locked and transmit a signal including the detection result to the front brake operating device 40A. The rear brake 60B is arranged proximate to the rear wheel 16. The rear brake 60B converts kinetic energy of the rear wheel 16 into thermal energy produced by friction. This attenuates rotation force of the rear wheel 16. The rear brake 60B has the same structure as the front brake 60A.

The front brake operating device 40A operates the front brake 60A. The front brake operating device 40A is coupled to, for example, the handlebar 18. The front brake 60A and the front brake operating device 40A are connected by wired communication, and configured to establish a data link to exchange data sets with each other. The process for establishing the data link is the same as that used for the shifting devices 52 and the shifting device operating devices 32. The front brake operating device 40A includes a vibrator (not shown). In a state where a signal is received from the front brake 60A, the vibrator is driven to vibrate the front brake operating device 40A.

In a state where the rider squeezes the front brake operating device 40A, the front brake operating device 40A transmits a signal including information related to the amount of power received from the rider to the front brake 60A. The front brake 60A controls an electrically-driven actuator (not shown) based on the received signal to adjust power that presses the brake pads against the wheel 14A of the front wheel 14.

The rear brake operating device 40B has the same structure as the front brake operating device 40A. The rear brake 60B has the same structure as the front brake 60A. The rear brake operating device 40B is operated in the same manner as the front brake operating device 40A. Also, the braking action of the rear brake 60B that is performed in accordance with the operation of the rear brake operating device 40B is the same as that of the front brake 60A.

The light 62 is arranged on the frame 12A or the handlebar 18. The light 62 emits light toward the front of the bicycle 10. The light operating device 42 operates the light 62, and is coupled to, for example, the handlebar 18. The light 62 and the light operating device 42 are connected by wired communication, and configured to establish a data link to exchange data sets with each other. The process of establishing the data link is the same as that used for the shifting devices 52 and the shifting device operating devices 32.

The light 62 includes, for example, functions for switching the light 62 between an on state and an off state. The light 62 further includes, for example, functions for switching the light 62 between a continuously illuminated state and an intermittently illuminated state. The light 62 further includes, for example, functions for switching the light 62 between a high beam state and a low beam state. The illumination state of the light 62 is switched in accordance with the operation of the light operating device 42.

The cycle computer 64 is coupled to, for example, the handlebar 18. The cycle computer 64 includes a display (not shown) that shows various kinds of information related to the bicycle 10 and the rider. The information shown on the display includes, for example, the vehicle speed of the bicycle 10 and the heart rate of the rider.

The sensor 44 measures the state of the bicycle 10 and the state of the rider. The sensor 44 includes, for example, a vehicle speed sensor 44A and a heart rate sensor 44B. The cycle computer 64 and the sensor 44 are connected by wired communication, and configured to establish a data link to exchange data sets with each other. The process for establishing the data link is the same as that used for the shifting devices 52 and the shifting device operating devices 32.

The vehicle speed sensor 44A is coupled to, for example, the frame 12A. The subject detected by the vehicle speed sensor 44A is a magnet (not shown), which is coupled to the wheel 16A of the rear wheel 16. The vehicle speed sensor 44A measures the vehicle speed of the bicycle 10 by detecting the rotation speed of the magnet. The heart rate sensor 44B is attached to the body of the rider to measure the heart rate of the rider. The heart rate sensor 44B is attached to, for example, the chest or the wrist.

The controller 70 receives wireless signals from the first bicycle component 30A and the second bicycle component 30B, and controls the third bicycle component 50A based on the received signals. The controller 70 includes a power button 76 (refer to FIG. 2). The controller 70 is located, for example, in the housing 58A of the electric assist unit 58. The power button 76 partially projects out of the housing 58A. The rider operates the power button 76 to switch the mode of the controller 70 to a power on mode or a power off mode.

Figure 2:
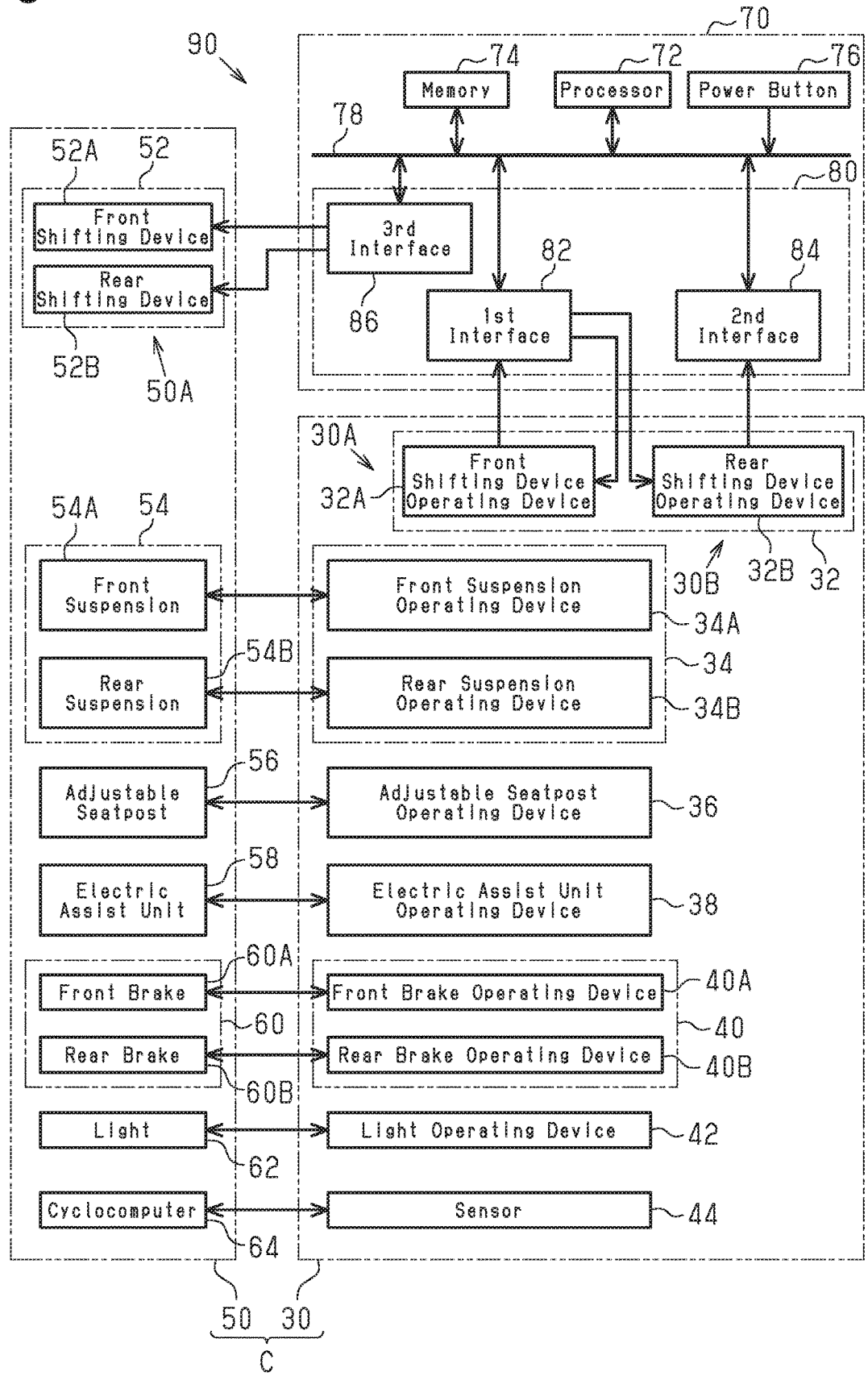
FIG. 2 is a block diagram showing a bicycle control system of the bicycle illustrated in FIG. 1.

The structure of a bicycle control system 90 will now be described with reference to FIG. 2. The bicycle control system 90 includes the first group 30 and the controller 70. In one example, the bicycle control system 90 further includes the second group 50. The controller 70 is an electronic controller that includes a processor 72, a memory 74, the power button 76, a bus 78 and interfaces 80. The interfaces 80 include a first interface 82, a second interface 84 and a third interface 86.

The processor 72, the memory 74, the power button 76, the first interface 82, the second interface 84 and the third interface 86 are electrically connected by the bus 78. The bus 78 is, for example, a PCI-Express bus. The bus 78 transmits information among the connected components.

In a first example of the structure of the controller 70, the processor 72, the memory 74, the first interface 82, the second interface 84 and the third interface 86 are formed by a separate semiconductor chip. In the first example of the structure of the controller 70, the processor 72, the memory 74, the first interface 82, the second interface 84 and the third interface 86 are each mounted on a board included in the controller 70. In a second example of the structure of the controller 70, the processor 72, the memory 74, the first interface 82, the second interface 84 and the third interface 86 are each a module that occupies a section of a single semiconductor chip. Thus, in the second example of the structure of the controller 70, the controller 70, the processor 72, the memory 74, the first interface 82, the second interface 84 and the third interface 86 are included in a single semiconductor chip forming the controller 70.

The second group 50 is configured to receive a control signal through wired communication. The first interface 82, is configured to establish a data link with the first bicycle component 30A. The first interface 82 is configured to receive the first wireless signal and transmit a third wireless signal. The second interface 84 is configured to establish a data link with the second bicycle component 30B. The second interface 84 is configured to receive the second wireless signal. The third interface 86 is configured to transmit a control signal to the third bicycle component 50A through wired communication. The control signal includes information for controlling the third bicycle component 50A. Alternatively, the third interface 86 and the third bicycle component 50A can exchange signals with each other through wireless communication.

The first wireless signal, the second wireless signal and the third wireless signal are each, for example, a wireless signal that complies with the IEEE 802.11b standard. The first wireless signal has a center frequency that is a first frequency. The first wireless signal includes data for controlling the third bicycle component 50A and includes at least one data set. The data set include a number of pieces of data. At least two pieces of the data have the same content. The data set increases the redundancy of signals and improves the communication quality. The center frequency of the second wireless signal is a second frequency that differs from the first frequency. The center frequency of the third wireless signal is a third frequency. The third frequency is the same as one of the first frequency and the second frequency or different from the first frequency and the second frequency. In one example, the third frequency differs from the first frequency and the second frequency.

The processor 72 switches the mode of the controller 70 between the power on mode and the power off mode. In a state where the controller 70 is in the power on mode, the processor 72 generates a control signal that controls the first bicycle component 30A, a control signal that controls the second bicycle component 30B, and a control signal that controls the third bicycle component 50A. The memory 74 stores the control signals generated by the processor 72 and data used by the processor 72 or the like. The memory 74 is, for example, a flash memory.

FIG. 3 shows the relationship between channels and channel widths that comply with the IEEE 802.11b standard. The first wireless signal, the second wireless signal and the third wireless signal are each assigned to any one of the channels. In a case that it is desired to avoid interference in the wireless signals, four channels are allocated between each two of the channels assigned to the wireless signals. In a case that the interference in the wireless signals is allowed, the number of channels allocated between each two of the channels assigned to the wireless signals can be set to three or less.

Figure 4:
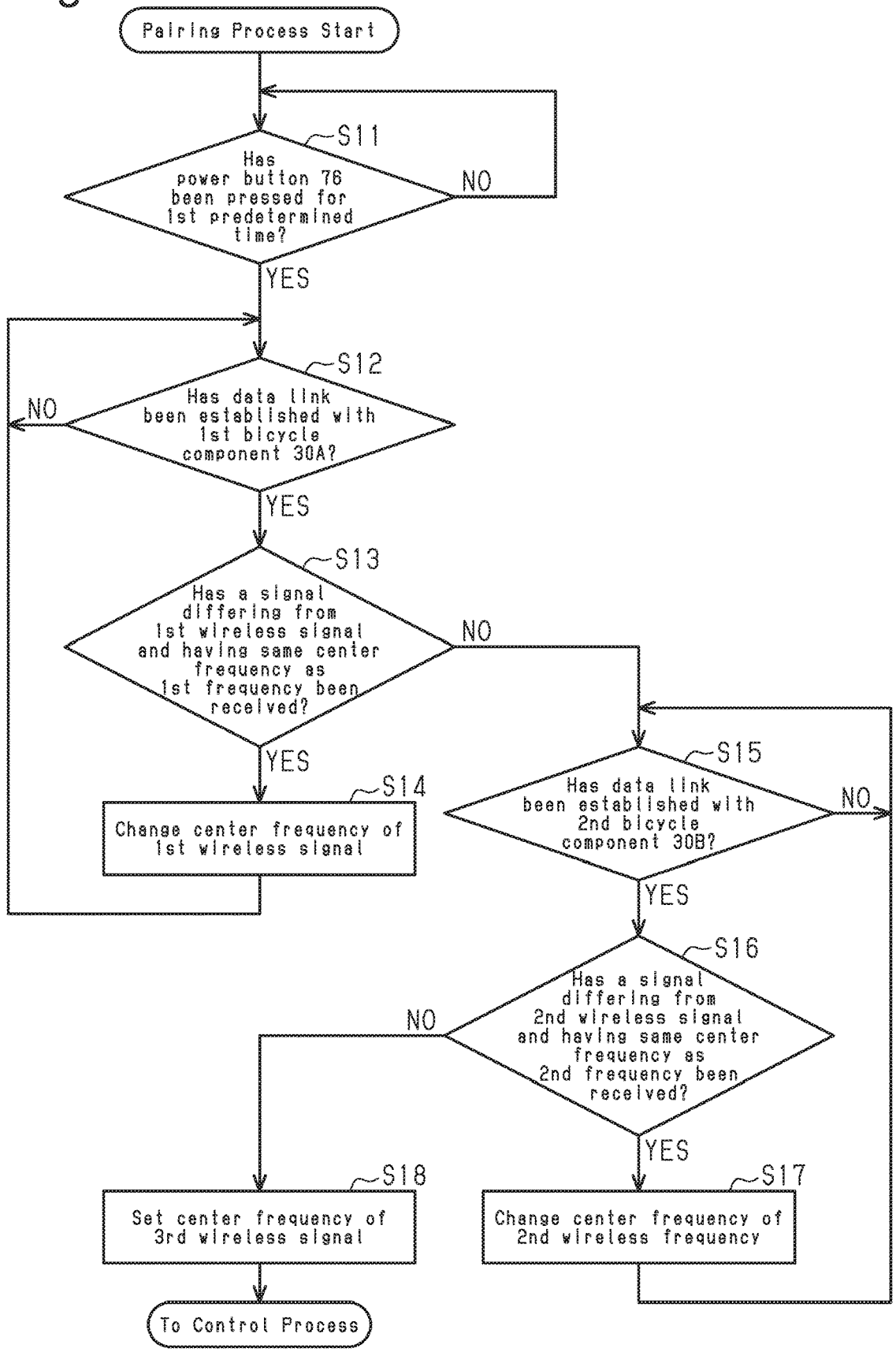
FIG. 4 is a flowchart showing one example of a pairing process executed by the bicycle controller in accordance with the first embodiment.

One example of control performed by the controller 70 will now be described with reference to FIGS. 4 to 6. The controller 70 performs at least the pairing process shown in FIG. 4, the control process shown in FIG. 5, and the interruption process shown in FIG. 6.

The pairing process executed by the controller 70 sets the center frequency of each wireless signal. The condition for starting the pairing process is a state where the power button 76 of the controller 70 is pressed. The control process transmits a control signal to the shifting device 52. The condition for starting the control process is a state where the process of step S18 shown in FIG. 4 is performed. The interruption process executed by the controller 70 suspends transmission of the first wireless signal and the second wireless signal or terminates the control performed by the controller 70. The condition for starting the interruption process is a state where an interruption signal is detected in any step of the control process. The interruption signal is any one of a wireless signal that differs from the first wireless signal and the center frequency of which is the first frequency (hereafter, referred to as "the first external signal"), a wireless signal that differs from the second wireless signal and the center frequency of which is the second frequency (hereafter, referred to as "the second external signal"), and a signal generated by pressing the power button 76 (hereafter, referred to as "the power signal").

The pairing process shown in FIG. 4 will now be described. In step S11, the processor 72 determines whether or not the power button 76 has been continuously pressed for a first predetermined time or longer. The first predetermined time is, for example, 0.5 seconds. In a case of an affirmative determination, the processor 72 changes the mode of the controller 70 from the power off mode to the power on mode and performs the process of step S12. In a case of a negative determination, the processor 72 maintains the power off mode of the controller 70 and again performs the process of step S11.

In step S12, the processor 72 attempts to establish a data link with the first bicycle component 30A and determines whether or not the data link has been established. One example of specific procedures will now be described. The first interface 82 receives the first wireless signal. The first frequency is, for example, 2412 MHz. The first wireless signal includes a header that includes data indicating that this wireless signal was transmitted by the first bicycle component 30A. The processor 72 checks the header of the wireless signal received by the first interface 82. In a case that the header includes the data indicating that the wireless signal was transmitted by the first bicycle component 30A, the processor 72 determines that the data link has been established. In a case that the determination result of step S12 is affirmative, the processor 72 performs the process of step S13. In a case that the determination result of step S12 is negative, the processor 72 again performs the process of step S12.

In step S13, the processor 72 determines whether or not a signal that differs from the first wireless signal but has the same center frequency as the first wireless signal has been received. In a state where some signals use the same frequency, the communication speed is decreased or the communication may be unstable. To detect such conditions, the processor 72 performs the process of step S13. In a case that the determination result of step S13 is affirmative, the processor 72 performs the process of step S14. In a case that the determination result of step S13 is negative, the processor 72 performs the process of step S15.

In step S14, the processor 72 changes the center frequency of the first wireless signal. In one example, the first frequency is updated from 2412 MHz to 2437 MHz, which is five channels next to 2412 MHz. Then, the center frequency of the first wireless signal is changed to the updated first frequency. The changing process is not limited to a movement of five channels and can be any channel movement. Then, the processor 72 again performs the process of step S12.

In step S15, the processor 72 attempts to establish a data link with the second bicycle component 30B and determines whether or not the data link has been established. One example of specific procedures will now be described. The second interface 84 receives the second wireless signal. In the same manner as the first wireless signal, the second wireless signal includes data for controlling the third bicycle component 50A. The center frequency of the second wireless signal is the second frequency. The second frequency, which is, for example, 2484 MHz, is set to differ from the first frequency. Thus, the second wireless signal is not likely to interfere with the first wireless signal. This allows for more stable communication. The processor 72 attempts to establish a data link with the second bicycle component 30B and determines whether or not the data link has been established. In a case of an affirmative determination, the processor 72 performs the process of step S16. In a case of a negative determination, the processor 72 again performs the process of step S15.

In step S16, the processor 72 determines whether or not a signal that differs from the second wireless signal but has the same center frequency as the second wireless signal has been received. This is performed for the same reason as the process of step S13. In a case of an affirmative determination, the processor 72 performs the process of step S17. In a case of a negative determination, the processor 72 performs the process of step S18.

In step S17, the processor 72 changes the center frequency of the second wireless signal. In one example, the second frequency is updated from 2484 MHz to 2462 MHz, which is three channels next to 2484 MHz. Then, the center frequency of the second wireless signal is changed to the updated second frequency. The changing process is not limited to a movement of three channels and can e any channel movement. Then, the processor 72 again performs the process of step S15.

In step S18, the processor 72 sets a channel that is assigned to the third wireless signal and sets the center frequency of the third wireless signal. The third frequency is set to a frequency that differs from the first frequency and the second frequency. Preferably, the frequency band of the third wireless signal does not include the frequency bands of the first wireless signal and the second wireless signal. The third frequency is for example, 2452 MHz. More specifically, the first wireless signal, the second wireless signal and the third wireless signal, which are wireless signals of a first channel, a sixth channel and a fourteenth channel, respectively, do not interfere with one another. This further stabilizes the communication performed in the bicycle control system 90.

The control process shown in FIG. 5 will now be described.

The control process executed by the controller 70 includes a first process group including steps S21 to S24 and a second process group including steps S25 to S28. The first process group and the second process group are performed in parallel.

In step S21, the processor 72 determines whether or not the data set of the first wireless signal includes data of the shift up instruction. In a case of an affirmative determination, the processor 72 performs the process of step S22. In a case of a negative determination, the processor 72 performs the process of step S23.

In step S22, the processor 72 controls the third interface 86 so that the third interface 86 transmits a shift up signal to the front shifting device 52A. Additionally, the processor 72 transmits, to the front shifting device operating device 32A, a third wireless signal that includes information indicating that the shift up signal has been transmitted to the front shifting device 52A. In a state where the process of step S22 is completed, the process of step S21 is again performed.

In step S23, the processor 72 determines whether or not the data set of the first wireless signal includes data indicating the shift down instruction. In a case of an affirmative determination, the processor 72 performs the process of step S24. In a case of a negative determination, the processor 72 again performs the process of step S21.

In step S24, the processor 72 controls the third interface 86 so that the third interface 86 transmits a shift down signal to the front shifting device. 52A. Additionally, the processor 72 transmits, to the front shifting device operating device 32A, a third wireless signal that includes information indicating that the shift down signal has been transmitted to the front shifting device 52A. In a state where the process of step S24 is completed, the process of step S21 is again performed.

In step S25, the processor 72 determines whether or not the data set of the second wireless signal includes information indicating the shift up instruction. In a case of an affirmative determination, the processor 72 performs the process of step S26. In a case of a negative determination, the processor 72 performs the process of step S27.

In step S26, the processor 72 controls the third interface 86 so that the third interface 86 transmits the shift up signal to the rear shifting device 52B. Additionally, the processor 72 transmits, to the rear shifting device operating device 32B, a third wireless signal that includes information indicating that the shift up signal has been transmitted to the rear shifting device 52B. In a state where the process of step S26 is completed, the process of step S25 is again preformed.

In step S27, the processor 72 determines whether or not data of the shift down instruction is detected in the data set of the second wireless signal. In a case of an affirmative determination, the processor 72 performs the process of step S28. In a case of a negative determination, the processor 72 again performs the process of step S25.

In step S28, the processor 72 controls the third interface 86 so that the third interface 86 transmits the shift down signal to the rear shifting device 52B. Additionally, the processor 72 transmits, to the rear shifting device operating device 32B, a third wireless signal that includes information indicating that the shift down signal has been transmitted to the rear shifting device 52B. In a state where the process of step S28 is completed, the process of step S25 is again performed.

The interruption process shown in FIG. 6 will now be described.

In step S31, the processor 72 determines whether or not the interruption signal has been continuously detected for a second predetermined time or longer. The second predetermined time is, for example, two seconds. In a case of an affirmative determination, the processor 72 performs the process of step S32. In a case of a negative determination, the processor 72 resumes the control process.

In step S32, the processor 72 determines the kind of the detected interruption signal. In a case that the detected interruption signal is the power signal, the processor 72 performs the process of step S33. In a case that the detected interruption signal is the first external signal, the processor 72 performs the process of step S34. In a case that the detected interruption signal is the second external signal, the processor 72 performs the process of step S35.

In step S33, the processor 72 controls the controller 70 to change the mode to the power off mode and terminates the control process.

In step S34, the processor 72 suspends transmission of the first wireless signal from the first bicycle component 30A. More specifically, the processor 72 transmits a third wireless signal that includes information for temporarily suspending the transmission of the first wireless signal to the first bicycle component 30A. This third wireless signal includes information for stopping the first bicycle component 30A from transmitting the first wireless signal until a third predetermined time elapses and for resuming the transmission of the first wireless signal after the third predetermined time elapses. The third predetermined time is, for example, ten milliseconds. In a state where the process of step S34 is completed, the processor 72 resumes the control process.

In step S35, the processor 72 suspends transmission of the second wireless signal from the second bicycle component 30B. More specifically, the processor 72 transmits a third wireless signal that includes information for temporarily suspending the transmission of the second wireless signal to the second bicycle component 30B. This third wireless signal includes information for stopping the second bicycle component 30B from transmitting the second wireless signal until the third predetermined time elapses and resuming the transmission of the second wireless signal after the third predetermined time elapses. In a state where the process of step S35 is completed, the processor 72 resumes the control process.

Second Embodiment

A second embodiment of the controller 70 differs from the first embodiment of the controller 70 in the following point. In the second embodiment, the controller 70 does not include the second interface 84. The first interface 82 receives wireless signals from the adjustable seatpost operating device 36, the front suspension operating device 34A and the rear suspension operating device 34B. The third interface 86 are connected to the adjustable seatpost 56 and the suspensions 54 by wired communication. The front shifting device 52A and the front shifting device operating device 32A are connected by wired communication. The rear shifting device 52B and the rear shifting device operating device 32B are connected by wired communication.

Figure 7:
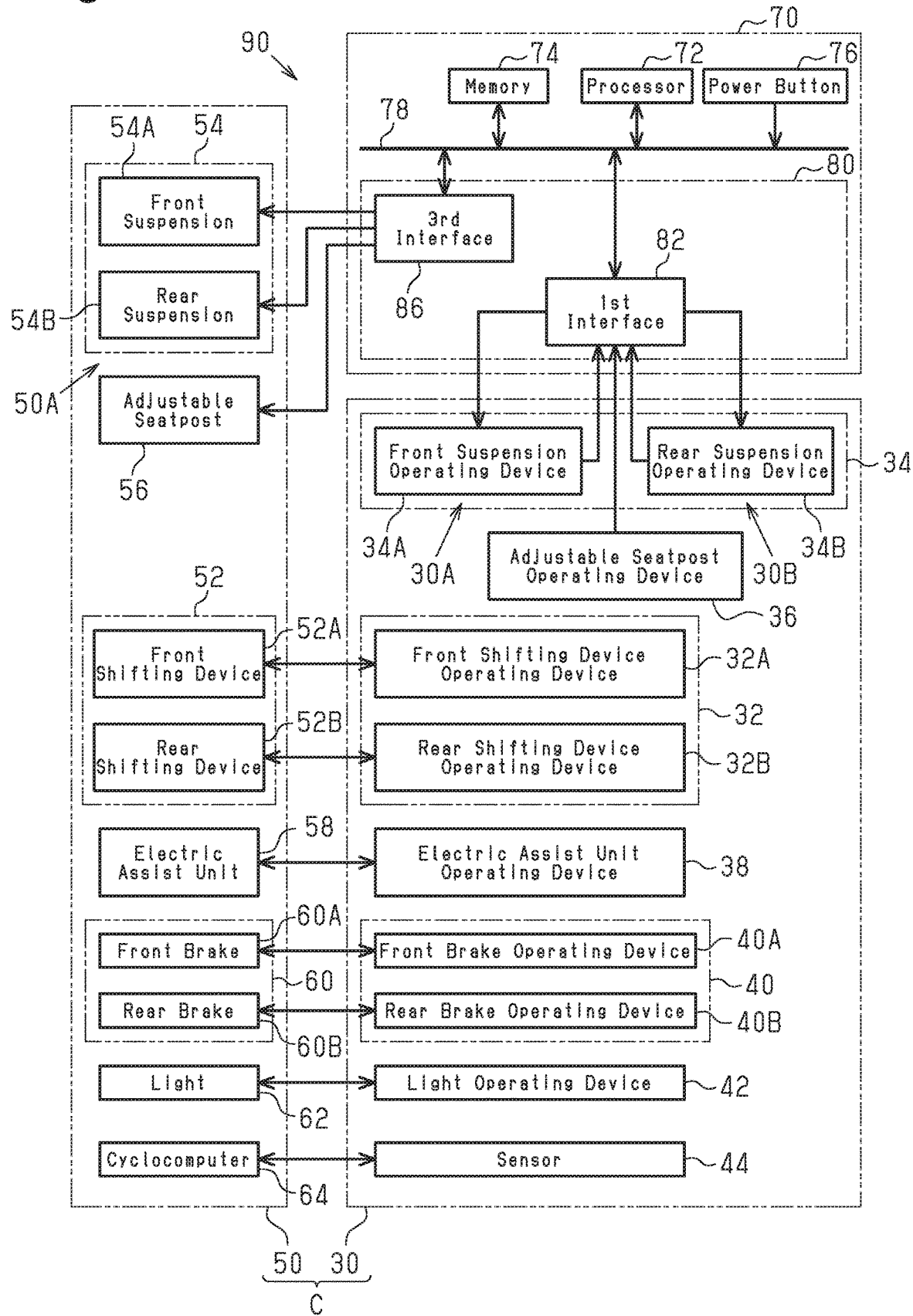
FIG. 7 is a block diagram showing a bicycle control system in accordance with a second embodiment.

The structure of the controller 70 will now be described with reference to FIG. 7. The first bicycle component 30A is the front suspension operating device 34A. The second bicycle component 30B is the rear suspension operating device 34B. The third bicycle component 50A is any one of the components in the second group 50 to which the third interface 86 transmits a signal. In the controller 70 of the second embodiment, wireless signals from the first group 30 are processed by only the first interface 82. This allows for reduction in the number of components in the interfaces 80 and miniaturization of the controller 70.

The first frequency is set to, for example, 2412 MHz. The second frequency is set to, for example, 2484 MHz. The center frequency of a wireless signal transmitted by the adjustable seatpost operating device 36 is any one of the first frequency and the second frequency and is set to, for example, the second frequency.

The interruption process shown in FIG. 8 will now be described. The pairing process and the control process are the same as those of the first embodiment when the description is read by replacing the first bicycle component 30A, the second bicycle component 30B and the third bicycle component 50A with the corresponding components and operations. Thus, the pairing process and the control process will not be described in detail.

In a case that transmission of an interruption signal or simultaneous transmission of multiple wireless signals using the second frequency is detected in any step of the control process, the processor 72 starts the interruption process. The interruption signal is any one of the first external signal, the second external signal and the power signal.

In step S41, the processor 72 determines whether or not the interruption signal has been continuously detected for a second predetermined time or longer. The second predetermined time is, for example, two seconds. In a case of an affirmative determination, the processor 72 performs the process of step S42. In a case of a negative determination, the processor 72 performs the process of step S46.

The processes of steps S42 to S45 are the same as those of steps S32 to step S35.

In step S46, the processor 72 determines whether or not the multiple wireless signals using the second frequency, that is, a wireless signal transmitted by the rear suspension operating device 34B and a wireless signal transmitted by the adjustable seatpost operating device 36, have been simultaneously transmitted. In a case of an affirmative determination, the processor 72 performs the process of step S47. In a case of a negative determination, the processor 72 resumes the control process.

In step S47, the processor 72 suspends transmission of any one of wireless signals using the second frequency. The wireless signals using the second frequency have predetermined priorities. The priorities are stored in the memory 74. In one example, the priority of the adjustable seatpost operating device 36 is set to be higher than that of the rear suspension operating device 34B. The processor 72 retrieves the priorities from the memory 74 and suspends transmission of the wireless signal from the first group 30 having a lower priority. The suspension time is, for example, ten milliseconds. Then, the processor 72 resumes the control process.

As described above, the controller 70 of the second embodiment is configured to receive signals from three components in the first group 30 using the wireless signals having two different center frequencies. Further, the priority is set for each component in the first group 30. This reduces the effect of interference in wireless signals.

Third Embodiment

A third embodiment of the controller 70 differs from the first embodiment of the controller 70 in the following points. In the third embodiment, the controller 70 further includes a fourth interface 88. The first interface 82 receives a wireless signal from the front brake operating device 40A. The second interface 84 receives a wireless signal from the rear brake operating device 40B. The third interface 86 is connected to the electric brakes 60, the electric assist unit 58, the light 62 and the cycle computer 64 by wired communication. The front shifting device 52A and the front shifting device operating device 32A are connected by wired communication. The rear shifting device 52B and the rear shifting device operating device 32B are connected by wired communication. The fourth interface 88 receives wireless signals from the electric assist unit operating device 38, the light operating device 42 and the sensor 44.

Figure 9:
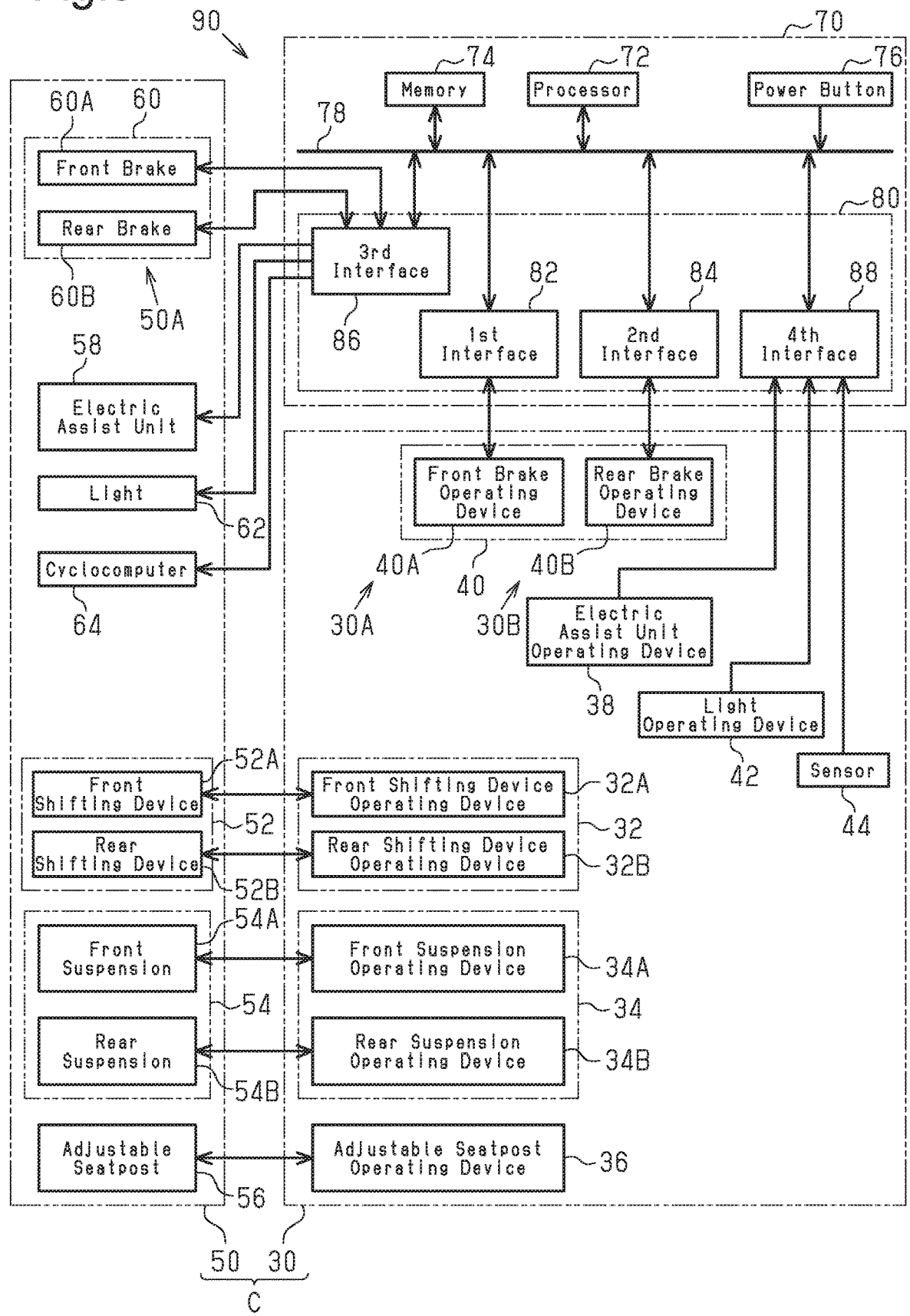
FIG. 9 is a block diagram showing of a bicycle control system in accordance with a third embodiment.

The structure of the controller 70 will now be described with reference to FIG. 9. The first bicycle component 30A and the second bicycle component 30B, which are any two of the components in the first group 30 that transmit wireless signals to the first interface 82, are, for example, the front brake operating device 40A and the rear brake operating device 40B. The third bicycle component 50A is any one of the components in the second group 50 to which the third interface 86 transmits a signal.

The fourth interface 88, which is an interface 80 similar to the first interface 82 and the second interface 84, is configured to communicate with the electric assist unit operating device 38, the light operating device 42 and the sensor 44 using a fourth wireless signal. The center frequency of the fourth wireless signal is a fourth frequency.

Figure 10:
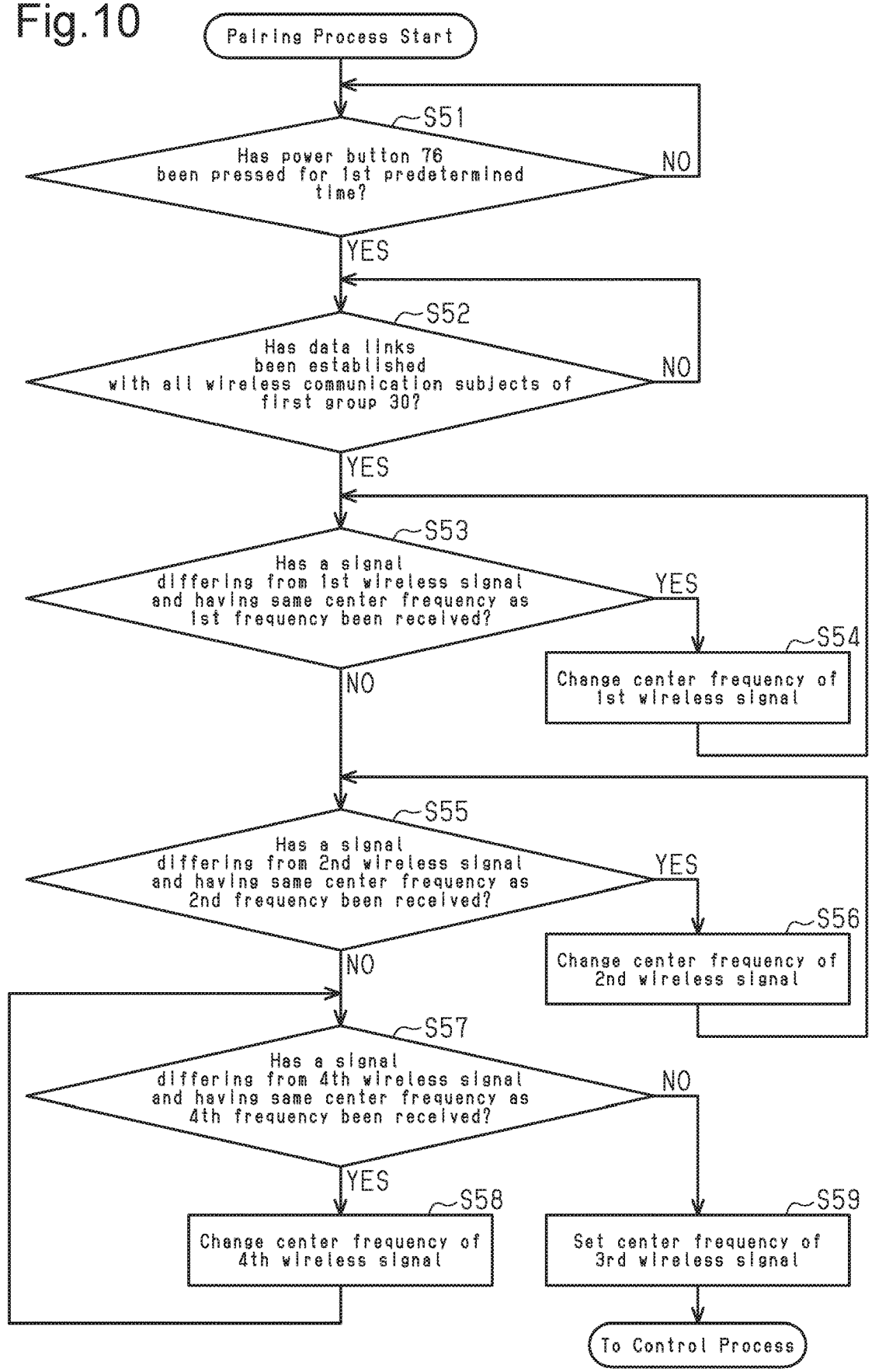
FIG. 10 is a flowchart showing one example of a pairing process executed by the bicycle control system in accordance with the third embodiment.

The pairing process will now be described with reference to FIG. 10.

In step S51, the processor 72 determines whether or not the power button 76 has been continuously pressed for a first predetermined time or longer. The first predetermined time is, for example, 0.5 seconds. In a case of an affirmative determination, the processor 72 changes the mode the controller 70 from the power off mode to the power on mode and performs the process of step S52. In a case of a negative determination, the processor 72 maintains the power off mode of the controller 70 and again performs the process of step S51.

In step S52, the processor 72 determines whether or not the data link has been established with all of wireless communication subjects in the first group 30. The wireless communication subjects in the first group 30 include the front brake operating device 40A, the rear brake operating device 40B, the electric assist unit operating device 38, the light operating device 42 and the sensor 44. In one example, the first frequency, the second frequency and the fourth frequency are 2412 MHz, 2484 MHz and 2437 MHz, respectively. The determination is performed on each wireless communication subject in the first group 30 in the same manner as the process of step S12. In a case of an affirmative determination, the processor 72 performs the process of step S53. In a case of a negative determination, the processor 72 again performs the process of step S52.

The process of step S53 is the same as the process of step S13. In a case of an affirmative determination, the processor 72 performs the process of step S54. In a case of a negative determination, the processor 72 performs the process of step S55.

The process of step S54 is the same as the process of step S14. Subsequent to step S54, the processor 72 again performs the process of step S53.

The process of step S55 is the same as the process of step S16. In a case of an affirmative determination, the processor 72 performs the process of step S56. In a case of a negative determination, the processor 72 performs the process of step S57.

The process of step S56 is the same as the process of step S17. Subsequent to step S56, the processor 72 again performs the process of step S55.

In step S57, the processor 72 determines whether or not a signal that differs from the fourth wireless signal but has the same center frequency as the fourth wireless signal has been received. In a case of an affirmative determination, the processor 72 performs the process of step S58. In a case of a negative determination, the processor 72 performs the process of step S59.

In step S58, the processor 72 changes the center frequency of the fourth wireless signal. In one example, the center frequency of the fourth wireless signal is changed to the center frequency of one of the available channels and that has not been set to the center frequency of other radio waves. Then, the processor 72 again performs the process of step S57.

In step S59, the processor 72 sets the center frequency of the third wireless signal. The third frequency is set to a frequency that differs from the first frequency, the second frequency and the fourth frequency. Preferably, the frequency band of the third wireless signal does not include the frequency bands of the first wireless signal, the second wireless signal and the fourth wireless signal. The third frequency is, for example, 2452 MHz. Then, the processor 72 starts the control process.

Figure 5:
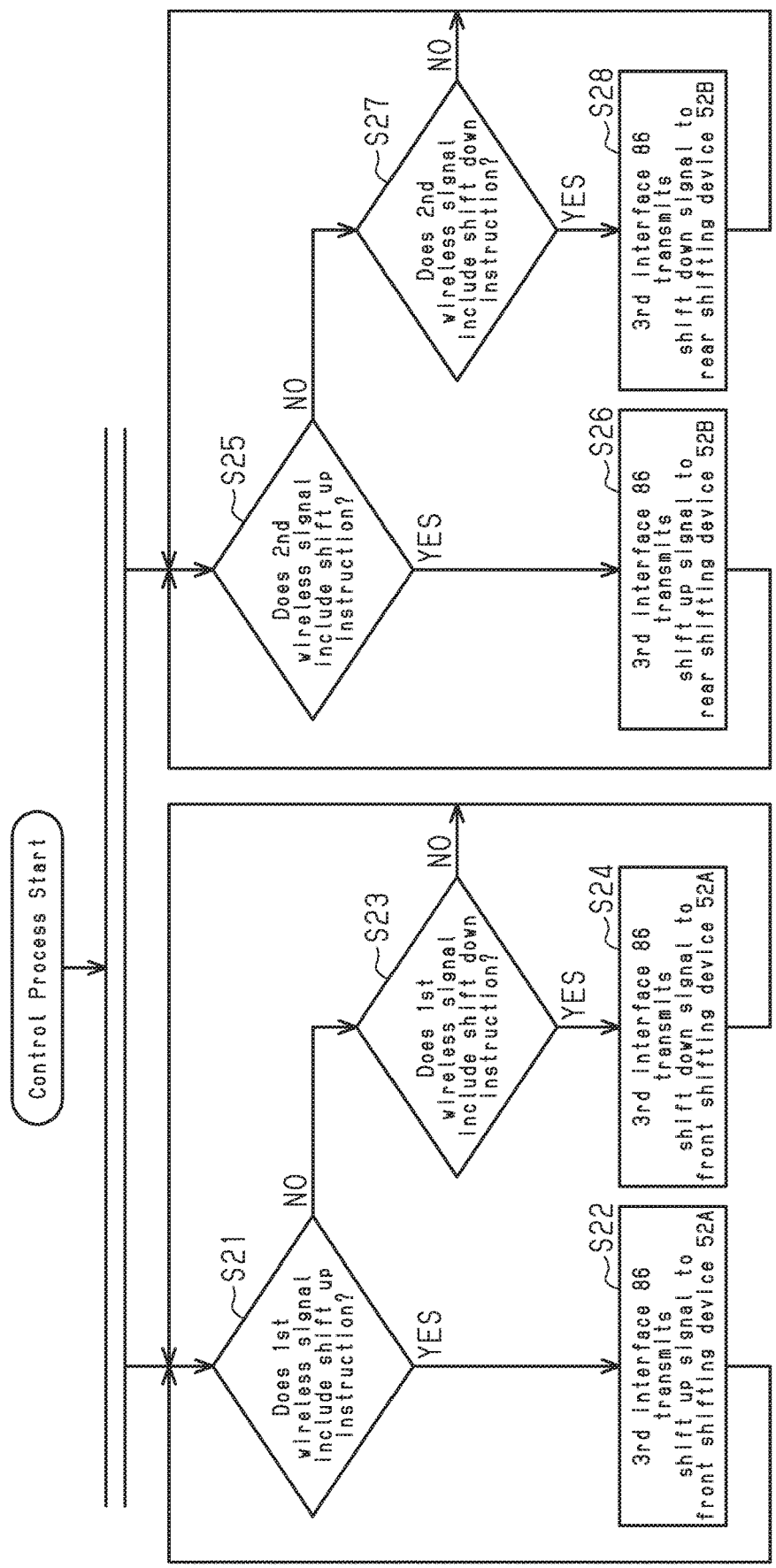
FIG. 5 is a flowchart showing one example of a control process executed by the bicycle controller in accordance with the first embodiment.
Figure 6:
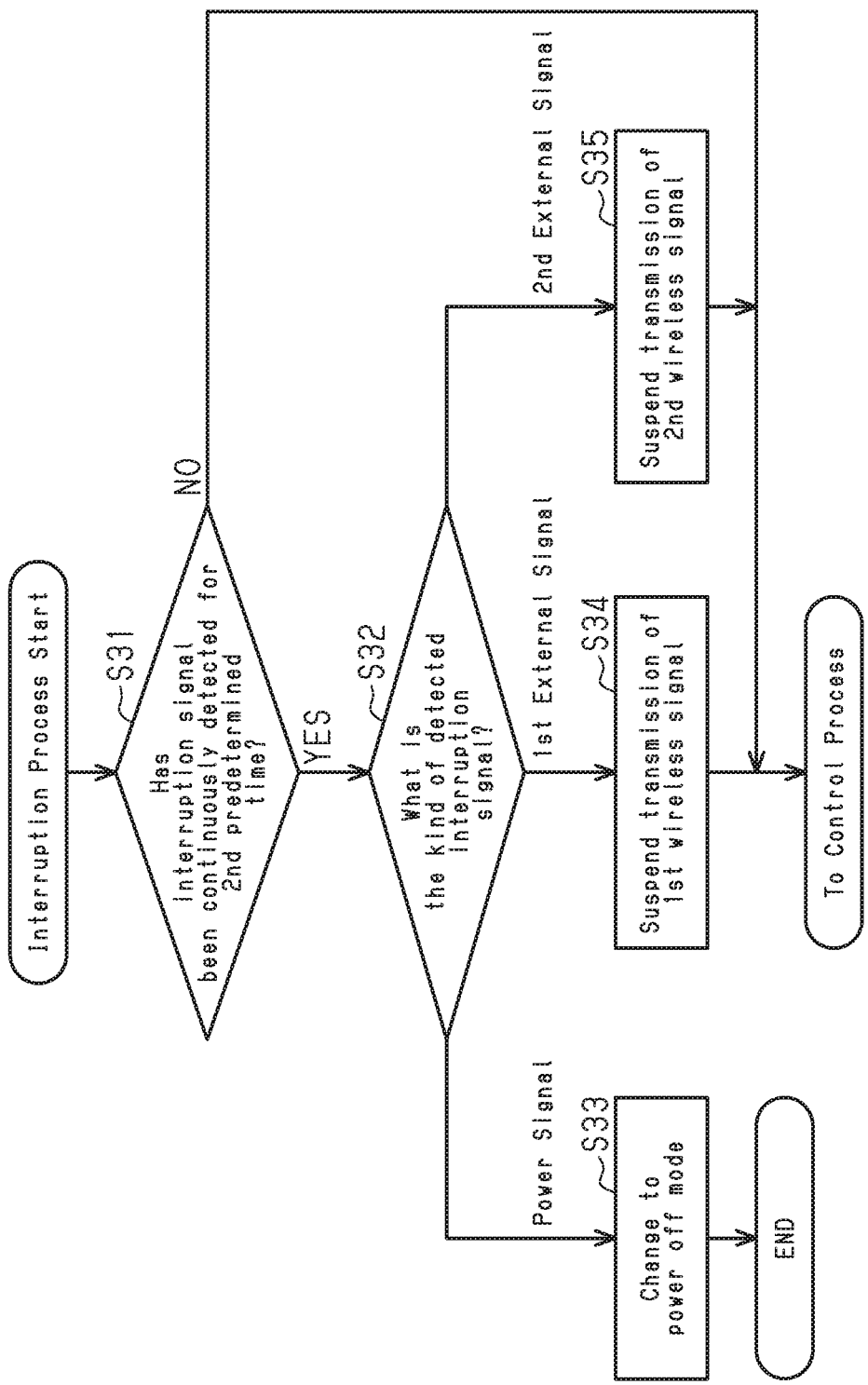
FIG. 6 is a flowchart showing one example of an interruption process executed by the bicycle controller in accordance with the first embodiment.
Figure 11:
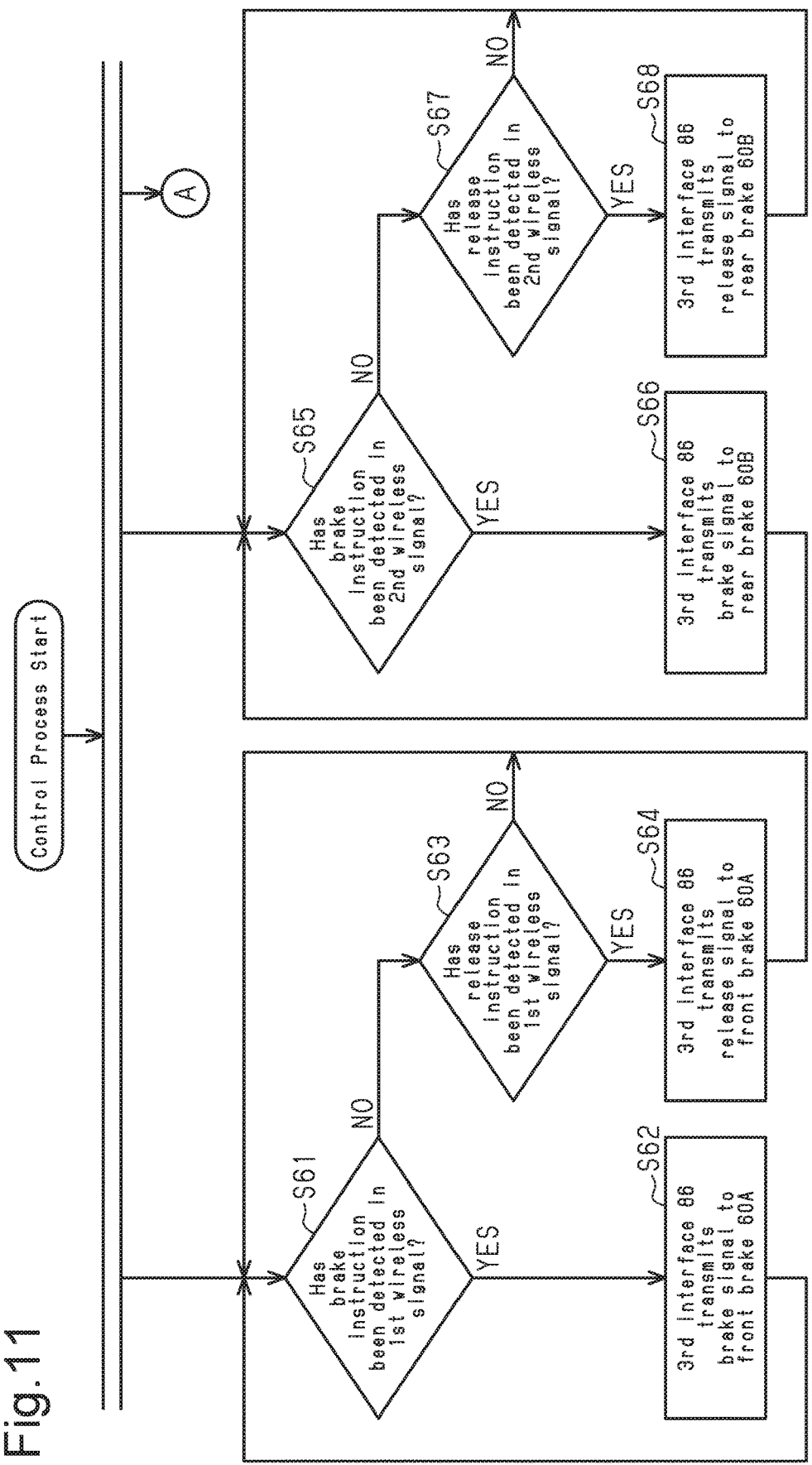
FIG. 11 is a flowchart showing one example of a control process executed by the bicycle control system in accordance with the third embodiment.

The processes of steps S61 to S68 shown in FIG. 11 are similar to those of steps S21 to S28 shown in FIG. 5. The shift up instruction, the shift down instruction, the front shifting device 52A and the rear shifting device 52B are read by replacing with a brake instruction, a release instruction, the front brake 60A and the rear brake 60B, respectively.

Figure 12:
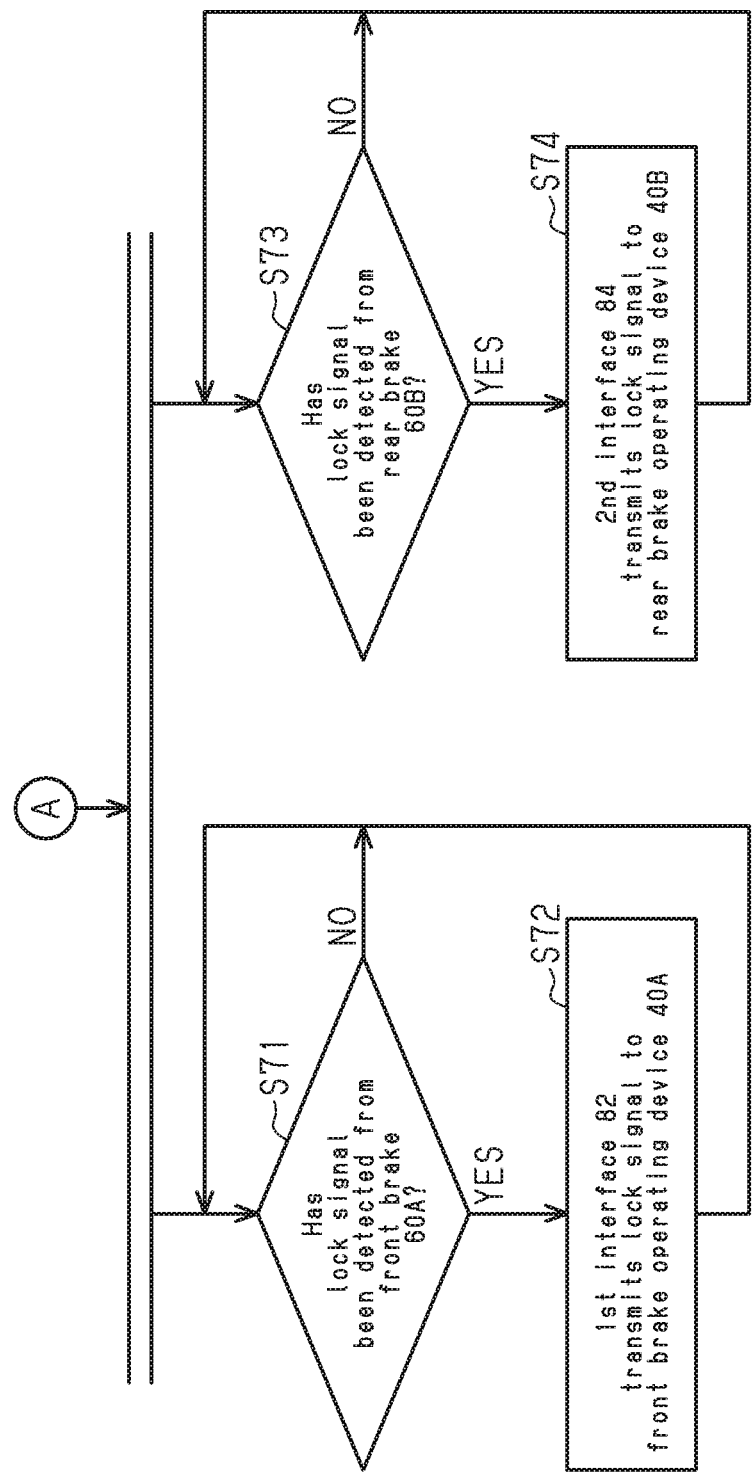
FIG. 12 is a flowchart showing a portion of the flowchart of FIG. 11.

In step S71 shown in FIG. 12, the processor 72 determines whether or not a lock signal from the front brake 60A is detected through the third interface 86. In a case of a negative determination, the processor 72 again performs the process of step S71. In a case of an affirmative determination, the processor 72 performs the process of step S72.

In step S72, the processor 72 transmits the lock signal, which has been received from the front brake 60A, to the front brake operating device 40A by means of the first interface 82 transmitting the third wireless signal. The transmission time of the lock signal is, for example, one millisecond. In a case that the front brake operating device 40A receives the third wireless signal and detects the lock signal from the front brake 60A, the front brake operating device 40A vibrates the vibrator to transmit the vibration to the right hand of the rider. The vibration time is, for example, ten milliseconds.

In step S73, the processor 72 determines whether or not a lock signal from the rear brake 60B is detected through the third interface 86. In a case of a negative determination, the processor 72 again performs the process of step S73. In a case of an affirmative determination, the processor 72 performs the process of step S74.

In step S74, the processor 72 transmits the lock signal, which has been received from the rear brake 60B, to the rear brake operating device 40B by means of the second interface 84 transmitting the third wireless signal. In a case that the front brake 60A and the rear brake 60B simultaneously transmit the lock signals, priority is given to the lock signal of the front brake 60A. The transmission of the lock signal from the rear brake 60B is suspended for, for example, one millisecond. In a case that the rear brake operating device 40B receives the third wireless signal and detects the lock signal from the rear brake 60B, the rear brake operating device 40B vibrates the vibrator to transmit the vibration to the left hand of the rider.

Each of the electric assist unit 58, the light operating device 42 and the sensor 44 transmits the fourth wireless signal to the fourth interface 88 when operated. The same processes as steps S61 to S64 are performed subsequent to the reception of the fourth wireless signal.

Figure 8:
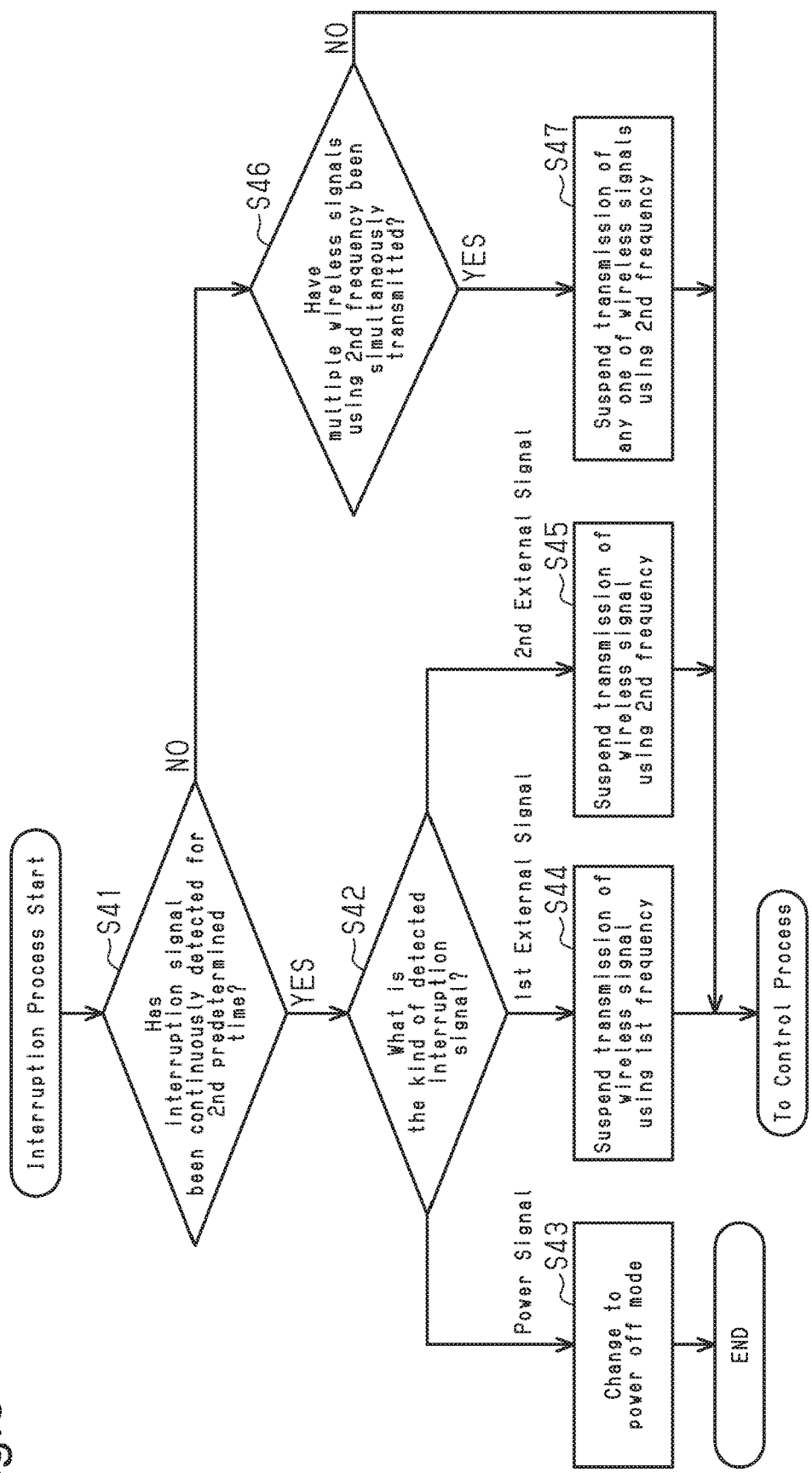
FIG. 8 is a flowchart showing one example of an interruption process executed by the bicycle control system in accordance with the second embodiment.

The interruption process includes the processes of steps S41 to 47 shown in FIG. 8 and a process performed on the wireless signal using the fourth frequency. The processor 72 performs the processes in accordance with the above configuration.

MODIFIED EXAMPLES

The above description illustrates embodiments of the bicycle controller according to the present invention and is not intended to be restrictive. The embodiments of the bicycle controller according to the present invention can be modified as follows. Further, two or more modified example can be combined.

The component generating control signals that control the first bicycle component 30A, the second bicycle component 50B and the third bicycle component 50A can be changed to any component. In a first example, the first interface 82 generates a control signal that controls the first bicycle component 30A. The processor 72 generates control signals other than the control signal of the first interface 82 and controls the operation of the first interface 82 so that the first interface 82 generates the corresponding control signal. In a second example, the second interface 84 generates a control signal that controls the second bicycle component 30B. The processor 72 generates control signals other than the control signal of the second interface 84 and controls the operation of the second interface 84 so that the second interface 84 generates the corresponding control signal. In a third example, the third interface 86 generates a control signal that controls the third bicycle component 50A. The processor 72 generates control signals other than the control signal of the third interface 86 and controls the operation of the third interface 86 so that the third interface 86 generates the corresponding control signal. A fourth example includes at least two of the first to third examples. The processor 72 generates control signals other than the control signals generated by the interfaces or does not generate control signals.

The number of wireless signals received by the interfaces 80 can be changed to any number. In a first example, the interfaces 80 receive only the first wireless signal. In a second example, the interfaces 80 receive only the second wireless signal. In a third example, the interfaces 80 receive only the fourth wireless signal. In a fourth example, the interfaces 80 receive only two of the first wireless signal, the second wireless signal and the fourth wireless signal. In a fifth example, in addition to the wireless signals received in the first to fourth examples, the interfaces 80 receive wireless signals other than the first wireless signal, the second wireless signal and the fourth wireless signal.

The first group 30 can have any configuration for transmitting wireless signals. In one example, at least one of the first bicycle component 30A and the second bicycle component 30B is configured to transmit both of the first wireless signal and the second wireless signal.

The controller 70 can be located in any position of the bicycle 10. In one example, one of the shifting devices 52, the suspensions 54, the adjustable seatpost 56, the electric assist unit 58, the electric brakes 60, the light 62 and the cycle computer 64, which are coupled to the bicycle 10, includes a housing. The controller 70 is located in the housing.

The wireless signals can comply with any wireless communication standard. A selectable wireless communication standard is, for example, the IEEE 802.11a standard, the IEEE 802.11g standard, the IEEE 802.11n standard, the IEEE 802.11ac standard, ANT+, or BLUETOOTH (registered trademark). Additionally, a frequency band other than the band of 2.4 GHz can be used.

The shifting devices 52 can be changed to any configuration. In a first example, the shifting devices 52 include only one of the front shifting device 52A and the rear shifting device 52B. In a second example, the shifting devices 52 include a derailleur gear instead of an internal shifting device. In this case, at least one of the front sprocket 24A and the rear sprocket 24B includes a plurality of sprockets 24 having different diameters. The shifting devices 52 change the gear ratio of the bicycle 10 by changing the sprocket 24 around which the chain 26 runs. In a third example, the shifting devices 52 include a gear box instead of an internal shifting device and an internal geared hub.

The third bicycle component 50A can be changed to any configuration. In a first example, the third bicycle component 50A includes the adjustable seatpost 56. In a second example, the third bicycle component 50A includes the electric assist unit 58. In a third example, the third bicycle component 50A includes the light 62. In a fourth example, the third bicycle component 50A includes the cycle computer 64.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

Also, it will be understood that although the terms "first" and "second" may be used herein to describe various components these components should not be limited by these terms. These terms are only used to distinguish one component from another. Thus, for example, a first component discussed above could be termed a second component and vice versa without departing from the teachings of the present invention. Finally, terms of degree such as "substantially", "about" and "approximately" as used herein mean an amount of deviation of the modified term such that the end result is not significantly changed.

Thus, the foregoing descriptions of the embodiments according to the present invention are provided for illustration only, and not for the purpose of limiting the invention as defined by the appended claims and their equivalents.

What is claimed is:

1. A bicycle control system, comprising:
an individual bicycle component configured to transmit both of a first wireless signal and a second wireless signal, the first wireless signal having a center frequency that is a first frequency, the second wireless signal having a center frequency that is a second frequency, the first frequency being different from the second frequency; and
a bicycle controller programmed to
set the center frequency of the first wireless signal and the center frequency of the second wireless signal, and to
change the center frequency the first wireless signal and the center frequency of the second wireless signal such that the center frequencies of the first and second wireless signals do not correspond to another center frequency of another wireless signal that is different from the first wireless signal and the second wireless signal.

2. The bicycle control system according to claim 1, wherein
the at least one of the first wireless signal and the second wireless signal includes at least one data set,
the at least one data set includes a plurality of pieces of data for controlling the individual bicycle component, and
at least two of the plurality of pieces of the data of the at least one data set have the same content.

3. The bicycle control system according to claim 1, wherein
at least one of the first wireless signal and the second wireless signal controls at least one of a shifting device, a suspension, an adjustable seatpost, an electric assist unit, an electric brake, a light, and a cycle computer.

4. The bicycle control system according to claim 3, wherein
the individual bicycle component is a shift operating device.

5. A bicycle component configured to transmit
at least one of a first wireless signal having a center frequency that is a first frequency and a second wireless signal having another center frequency that is a second frequency, the bicycle component being configured to change the center frequency of the first wireless signal from the first frequency upon receiving a wireless signal that is different from the first wireless signal and the wireless signal has a center frequency that corresponds to the first frequency of the first wireless signal,
the bicycle component being configured to change the another center frequency of the second wireless signal from the second frequency upon receiving a wireless signal that is different from the second wireless signal and the wireless signal has a center frequency that corresponds to the second frequency of the second wireless signal.

6. The bicycle component according to claim wherein
the at least one of the first wireless signal and second wireless signal includes at least one data set,
the at least one data set includes a plurality of pieces of data for controlling the bicycle component, and
at least two of the plurality of pieces of the data of the at least one data set have the same content.

7. The bicycle component according to claim 5, wherein
at least one of the first wireless signal and the second wireless signal controls at least one of a shifting device, a suspension, an adjustable seatpost, an electric assist unit, an electric brake, a light, and a cycle computer.

8. The bicycle component according to claim 7, wherein the bicycle component is a shift operating device.

9. The bicycle component according to claim 5, wherein
the bicycle component includes a first bicycle component and a second bicycle component,
the first bicycle component being configured to transmit the first wireless signal and to change the center frequency of the first wireless signal, and
the second bicycle component being configured to transmit the second wireless signal and to change the center frequency of the second wireless signal.

10. A bicycle component that is configured to transmit at least one of a first wireless signal and a second wireless signal, wherein
the first wireless signal has a center frequency that is a first frequency,
the second wireless signal has a center frequency that is a second frequency, and the second frequency differs from the first frequency,
the bicycle component being further configured to suspend, by temporarily halting and automatically resuming after a predetermined period, transmission of the at least one of the first wireless signal and the second wireless signal upon receiving a wireless signal having a center frequency that corresponds to at least one of the first frequency and the second frequency, the bicycle component being further configured to suspend transmission of at least one of the first and second wireless signals upon receiving a third wireless signal that includes information for stopping transmission of at least one of the first and second wireless signals.

11. The bicycle component according to claim 10, wherein
the at least one of the first wireless signal and the second wireless signal includes at least one data set,
the at least one data set includes a plurality of pieces of data for controlling the bicycle component, and
at least two of the plurality of pieces of the data of the at least one data set have the same content.

12. The bicycle component according to claim 10, wherein
at least one of the first wireless signal and the second wireless signal controls at least one of a shifting device, a suspension, an adjustable seatpost, an electric assist unit, an electric brake, a light, and a cycle computer.

13. The bicycle component according to claim 12, wherein
the bicycle component is a shifting operating device.

14. The bicycle component according to claim 10, wherein
the bicycle component includes a first bicycle component and a second bicycle component,
the first bicycle component being configured to transmit the first wireless signal and to suspend transmission of the first wireless signal, and
the second bicycle component being configured to transmit the second wireless signal and to suspend transmission of the second wireless signal.

15. The bicycle component according to claim 10, wherein
the third wireless signal includes information for stopping the bicycle component from transmitting the second wireless signal until a predetermined time elapses and resuming B the transmission of the second wireless signal after the predetermined time elapses.

* * * * *